United States Patent
Jeter et al.

(10) Patent No.: US 12,542,189 B1
(45) Date of Patent: Feb. 3, 2026

(54) MEMORY CALIBRATION WITH REDUCED CALIBRATION PARAMETERS

(71) Applicant: Apple Inc., Cupertino, CA (US)

(72) Inventors: Robert E. Jeter, Santa Clara, CA (US); Jean-Didier Allegrucci, Sunnyvale, CA (US); Jingkui Zheng, Sunnyvale, CA (US); Kai Lun Hsiung, Fremont, CA (US); Venkata Ramana Malladi, Santa Clara, CA (US); Srinivasa Rao Masanam, Cedar Park, TX (US); Alma L. Juarez Dominguez, Campbell, CA (US); Moosa Yahyazadeh, Milpitas, CA (US); Karthik Vathool Jambunatha Ramani, Sunnyvale, CA (US); Prerana P. Sarode, St Albans (GB); Satish B. Dulam, Sunnyvale, CA (US); Brooke E. Benzenberg, Sunnyvale, CA (US); Rahul Ranjan, Campbell, CA (US); Naveen Kumar Korada, Round Rock, TX (US)

(73) Assignee: Apple Inc., Cupertino, CA (US)

( * ) Notice: Subject to any disclaimer, the term of this patent is extended or adjusted under 35 U.S.C. 154(b) by 171 days.

(21) Appl. No.: 18/533,913

(22) Filed: Dec. 8, 2023

Related U.S. Application Data

(60) Provisional application No. 63/584,743, filed on Sep. 22, 2023.

(51) Int. Cl.
*G11C 29/02* (2006.01)

(52) U.S. Cl.
CPC .......... *G11C 29/021* (2013.01); *G11C 29/028* (2013.01); *G11C 2207/2254* (2013.01)

(58) Field of Classification Search
CPC ............... G11C 29/021; G11C 29/028; G11C 2207/2254
See application file for complete search history.

(56) References Cited

U.S. PATENT DOCUMENTS

| | | | |
|---|---|---|---|
| 9,087,615 B2 | 7/2015 | Cordero et al. | |
| 10,388,402 B2 | 8/2019 | Lee et al. | |
| 10,679,698 B2 | 6/2020 | Damle et al. | |
| 10,991,403 B2 | 4/2021 | Jeter et al. | |
| 2019/0259429 A1* | 8/2019 | Heo | G11C 29/028 |
| 2020/0106598 A1* | 4/2020 | Stott | H04L 7/0041 |
| 2020/0265881 A1* | 8/2020 | Jeter | G11C 29/028 |
| 2022/0291848 A1 | 9/2022 | Ware et al. | |

* cited by examiner

*Primary Examiner* — Jerome Leboeuf
(74) *Attorney, Agent, or Firm* — DICKINSON WRIGHT RLLP

(57) ABSTRACT

A memory controller is configured to communicate with a memory. The memory controller includes a calibration control circuit configured to perform calibrations of memory signals conveyed between the memory controller and the memory. A storage circuit is configured to store results of the calibrations, including voltage and timing margins of the memory signals. A monitoring circuit is configured to access results of the calibrations stored in the storage circuit to determine whether a set of calibration metrics are being met or exceeded during a period of time. In response to the set of calibration metrics being met or exceeded during the period of time, the monitoring circuit is configured to cause the calibration control circuit to operate in a reduced calibration mode that reduces an amount of time the calibration control circuit spends performing one or more subsequent calibrations.

20 Claims, 12 Drawing Sheets

| Mode | Monitoring Results | Loop Count | End Point Replay | Step Size | Vref/ ODT | HCAL Type | Comment |
|---|---|---|---|---|---|---|---|
| 1 | Eye << T1 | 2 | 8 | 1 | On | Full Scan | Eye is significantly smaller than threshold. Increase calibration time and accuracy, use higher loop count and additional iterations of end point replay |
| 2 | Eye < T1 | 2 | 4 | 1 | On | Full Scan | Eye is smaller than threshold. Increase calibration time and accuracy, use higher loop count and enable end point replay |
| 3 | T1 < Eye < T2 | 1 | 0 | 1 | On | Binary Scan | Eye is within a specified nominal range. Use power-on reset (POR) calibration parameters |
| 4 | Eye > T2 | 1 | 0 | 2 | On | Binary Scan | Eye is larger than upper threshold of nominal range. Calibration parameters are relaxed from POR parameters to reduce calibration time |
| 5 | Eye >> T2 | 1 | 0 | 4 | Off | Binary Scan | Eye is significantly larger than upper threshold of nominal range. Calibration parameters relaxed further for additional reductions in calibration time |

| Mode | Monitoring Results | Loop Count | End Point Replay | Step Size | Vref/ODT | HCAL Type | Comment |
|---|---|---|---|---|---|---|---|
| 1 | Eye << T1 | 2 | 8 | 1 | On | Full Scan | Eye is significantly smaller than threshold. Increase calibration time and accuracy, use higher loop count and additional iterations of end point replay |
| 2 | Eye < T1 | 2 | 4 | 1 | On | Full Scan | Eye is smaller than threshold. Increase calibration time and accuracy, use higher loop count and enable end point replay |
| 3 | T1 < Eye < T2 | 1 | 0 | 1 | On | Binary Scan | Eye is within a specified nominal range. Use power-on reset (POR) calibration parameters |
| 4 | Eye > T2 | 1 | 0 | 2 | On | Binary Scan | Eye is larger than upper threshold of nominal range. Calibration parameters are relaxed from POR parameters to reduce calibration time |
| 5 | Eye >> T2 | 1 | 0 | 4 | Off | Binary Scan | Eye is significantly larger than upper threshold of nominal range. Calibration parameters relaxed further for additional reductions in calibration time |

MEMORY CALIBRATION WITH REDUCED CALIBRATION PARAMETERS

PRIORITY CLAIM

The present application claims priority to U.S. Provisional App. No. 63/584,743 entitled "Memory Calibration with Reduced Calibration Parameters," filed Sep. 22, 2023, the disclosure of which is incorporated by reference herein in its entirety.

BACKGROUND

Technical Field

This disclosure is directed to memory systems, and more particularly, to calibration of signals exchanged between a memory controller and a memory.

Description of the Related Art

Eye patterns, or eye diagrams, are graphic illustrations that illustrate times and amplitudes at which a digital signal can be sampled at its correct value. In various types of systems that include data transmissions, it is desirable to sample signals (e.g., data signals synchronized by a clock signal) near a center of an eye, in terms of time and sampling voltage. In terms of timing, this can provide a signal with a sufficient amount of both setup and hold time, while also rendering it less susceptible to noise. In terms of voltage, this can enable a more accurate determination of a logic value (e.g., logic 1 or logic 0) based on a reference voltage used to distinguish one from the other.

In memory subsystems, calibrations may be performed to determine the points at which signals are sampled within the eye pattern. Calibrations are performed to determine an eye diagram that enables accurate sampling of signals, and thus include calibrations based both on the timing (sometimes referred to as a horizontal calibration) and sampling reference voltage (sometimes referred to as a vertical calibration). Performing these calibrations typically includes adjusting a number of different parameters that govern transmission of data between a memory controller and a memory. These parameters include a delay applied to a data strobe signal as well as the aforementioned reference voltage.

SUMMARY

Memory calibration with reduced calibration parameters is disclosed. In one embodiment, a memory controller is configured to communicate with a memory. The memory controller includes a calibration control circuit configured to perform calibrations of memory signals conveyed between the memory controller and the memory. A storage circuit is configured to store results of the calibrations, including voltage and timing margins of one or more of the memory signals. A monitoring circuit is configured to access results of the calibrations stored in the storage circuit to determine whether a set of calibration metrics are being met or exceeded during a period of time. In response to the set of calibration metrics being met or exceeded during the period of time, the monitoring circuit is configured to cause the calibration control circuit to operate in a reduced calibration mode that reduces an amount of time the calibration control circuit spends performing one or more subsequent calibrations.

BRIEF DESCRIPTION OF THE DRAWINGS

The following detailed description makes reference to the accompanying drawings, which are now briefly described.

FIG. 4 is a table illustrating details of a plurality of calibration modes in which memory calibrations may be carried out by one embodiment of a memory controller.

DETAILED DESCRIPTION OF EMBODIMENTS

Figure 1:
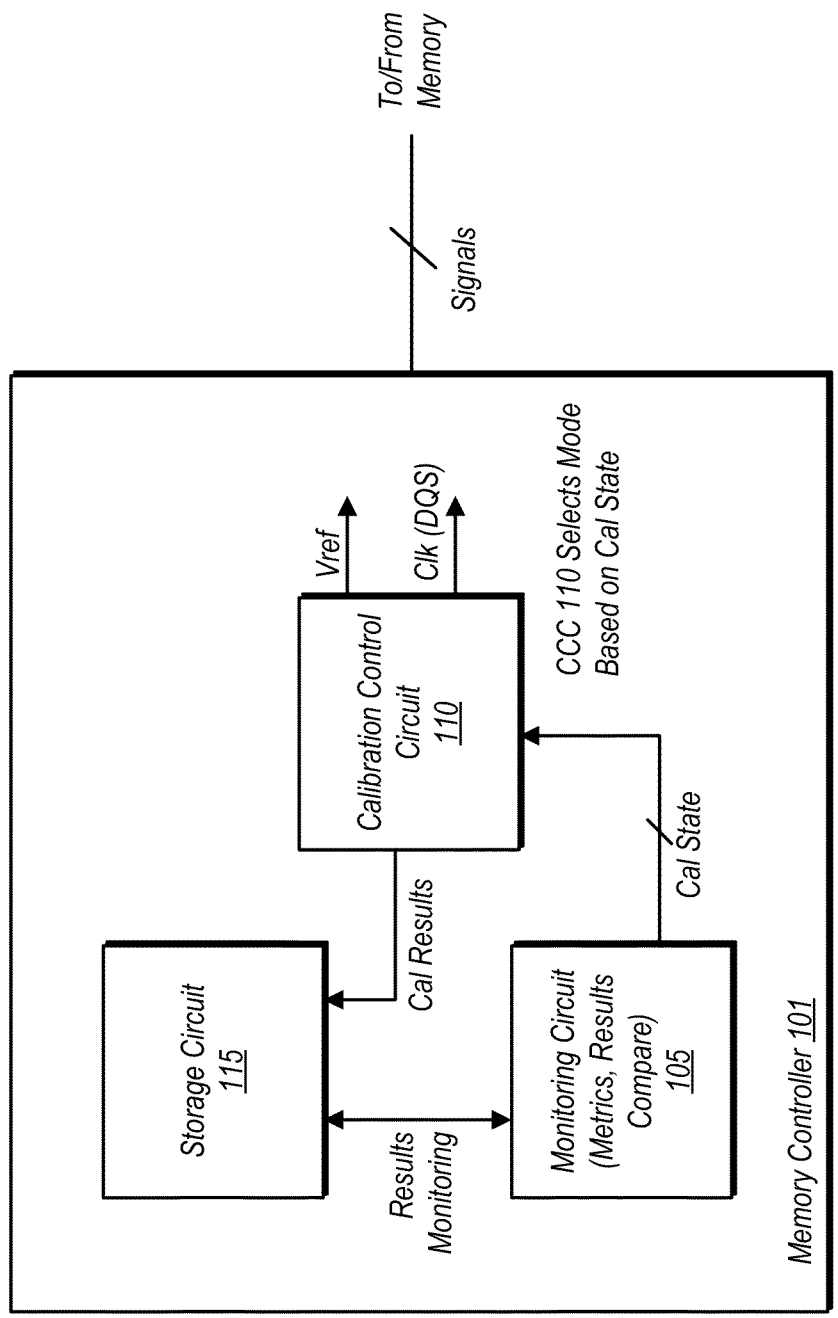
FIG. 1 is a block diagram of one embodiment of a memory controller.

At various times during their operation (e.g., on system startup, periodically thereafter, during performance state changes), calibrations are performed in memory subsystems to ensure sufficient timing and voltage margins for signals conveyed between a memory controller and a memory. These signals may include clock signals, such as a read data strobe and a write data strobe that are used to synchronize read and write operations, respectively. This impacts memory availability, as normal memory traffic is typically suspended while calibrations are being carried out. The reduced availability of memory can negatively impact system performance. Additionally, the calibrations consume power that does not directly contributed to the performance of the system.

The present disclosure utilizes the insight that, if calibration margins are sufficient (e.g., exceed minimum acceptable thresholds) over a number of calibrations, the amount of time spent performing calibrations may be reduced. Accordingly, the present disclosure contemplates an apparatus and methodology in which calibration results are monitored over time and, if margins are sufficient, to reduce the amount of time spent calibrating. The calibration results may include voltage and timing margins relative to various thresholds that may vary in different calibration modes. The reductions in time spent in carrying out calibrations may come in the form of reducing the accuracy of calibrations (e.g., by reducing the number of steps), reducing the frequency at which calibrations are performed, reducing the number of calibration loops carried out in a given calibration, and so on.

In various embodiments, calibration results are stored and monitored over time, and if margins are sufficient, various mechanisms to reduce the amount of time performing subsequent calibrations may be implemented. Wider margins may result in more reductions of calibration time.

The disclosure contemplates performing calibrations in different modes, wherein the level of restrictiveness varies from one calibration mode to the next. During operation in a particular calibration mode, if margins exceed some threshold for a certain amount of time (e.g., for a particular number of consecutive calibrations), the calibration mode may be changed to another one in which the amount of time spent calibrating is reduced. The methodology of the disclosure may operate asymmetrically in that, if during operation in a reduced calibration mode, the margins are less than a threshold for as little as one cycle, the calibration mode is changed back to one in which more time is spent calibrating. Additionally, in at least one reduced calibration mode, ODT (on-die termination) is disabled, thereby saving additional power.

Utilizing the apparatus and methodology of the present disclosure, less time can be spent calibrating the memory when voltage and timing margins are good. This has the benefit of both increasing the memory availability, as well as increasing the ratio of performance per watt of power consumed, as the power previously used for calibration is allocated to the actual performance of tasks by the system.

Figure 2:
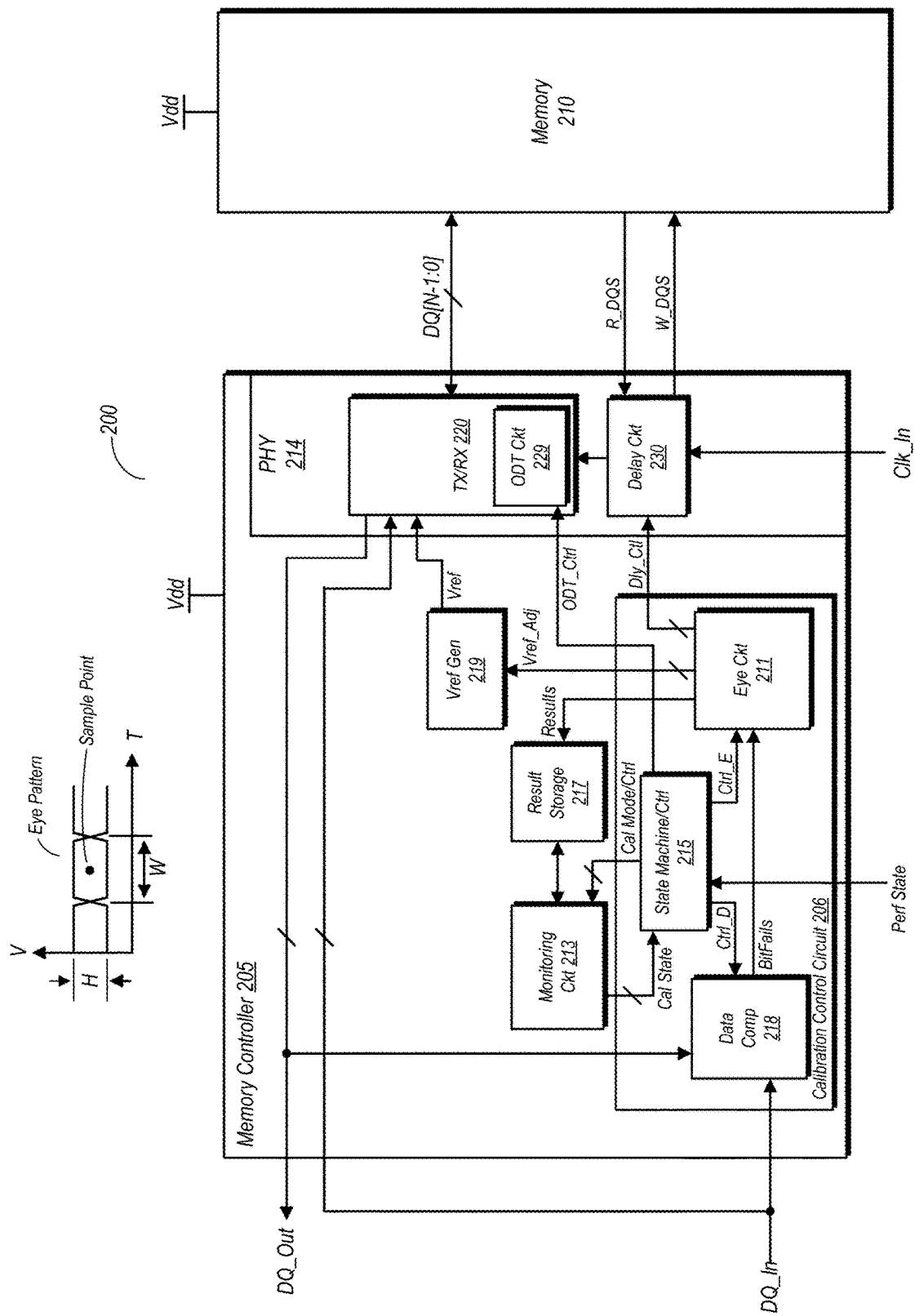
FIG. 2 is a block diagram of one embodiment of a memory subsystem including a memory controller and a memory.
Figure 3:
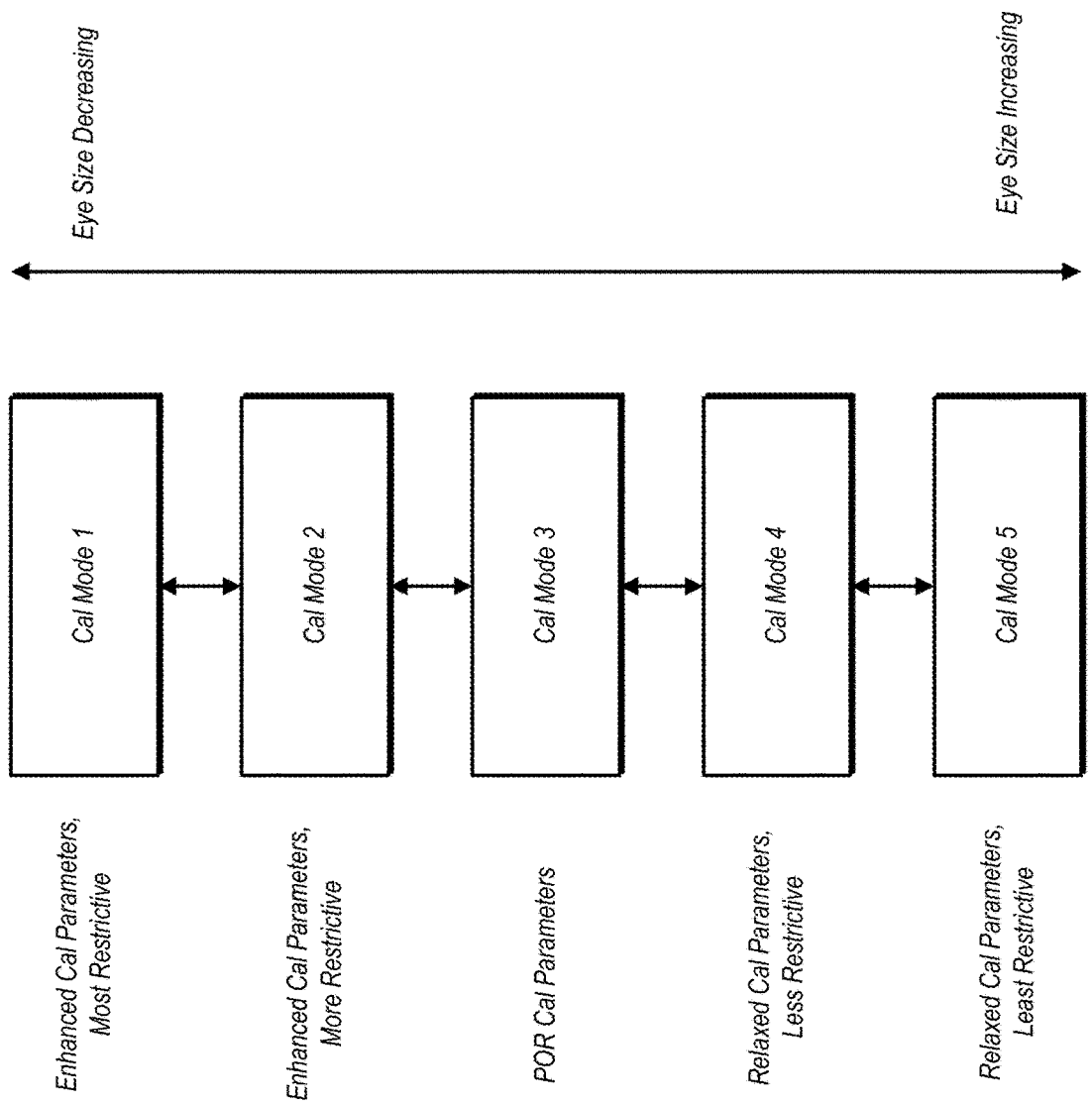
FIG. 3 is a block diagram illustrating a plurality of calibration modes in which memory calibrations may be carried out by one embodiment of a memory controller.
Figure 5:
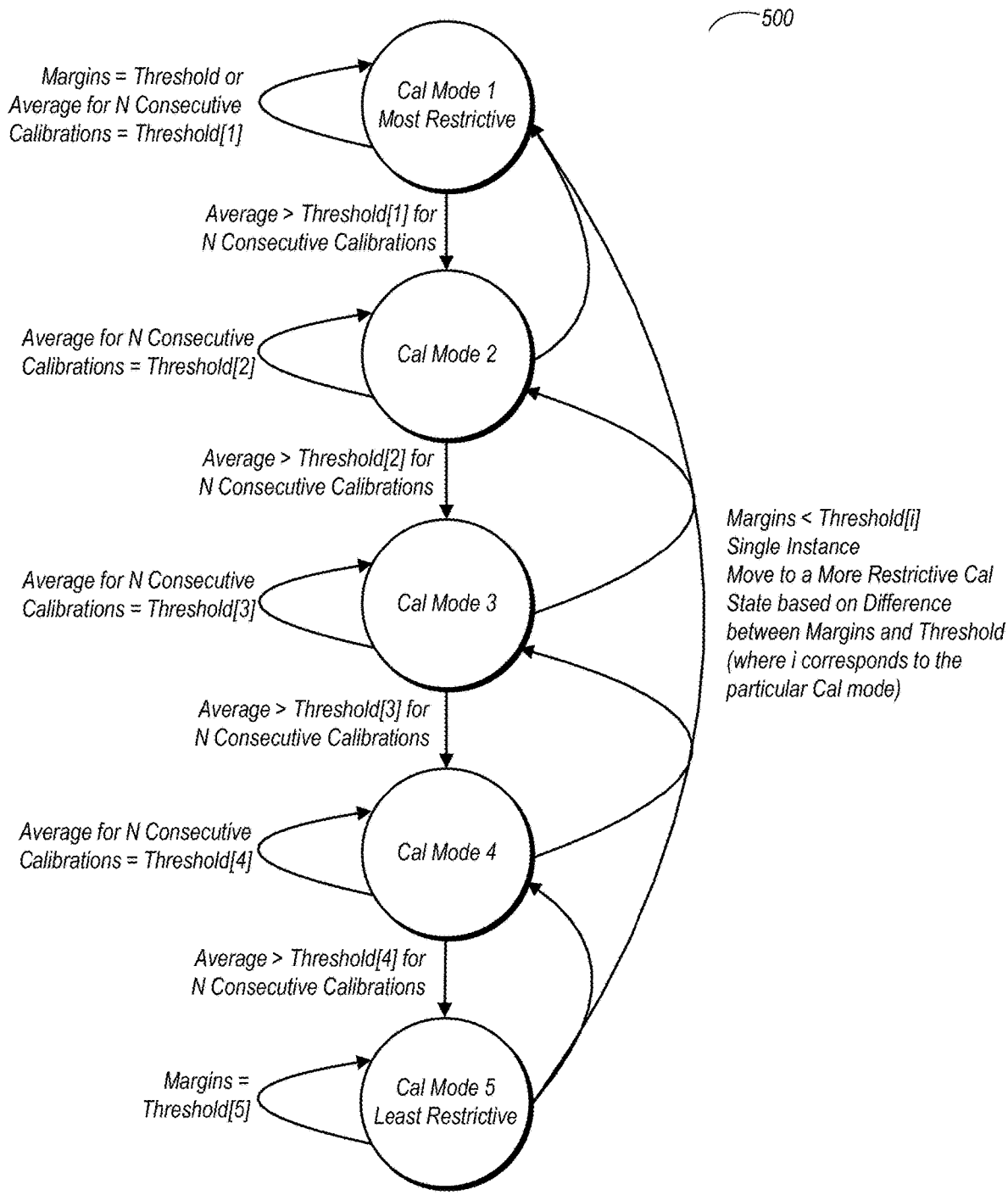
FIG. 5 is a state diagram illustrating operation of one embodiment of a memory controller capable of performing calibrations in various ones of a plurality of calibration modes.
Figure 6A:
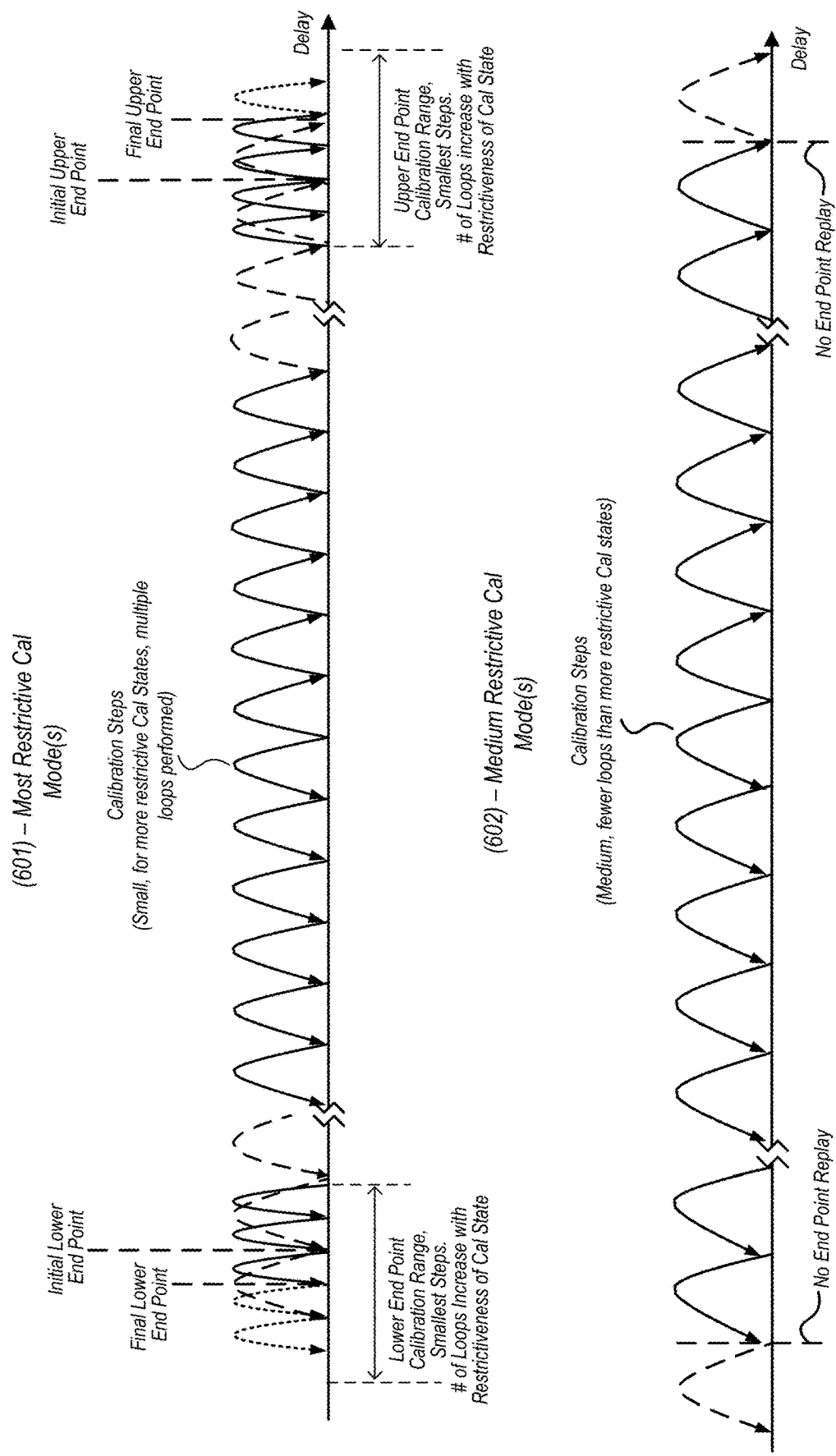
FIGS. 6A-6B illustrate details with regard to the variation of certain calibrations performed in different modes for one embodiment of a memory controller.
Figure 6B:
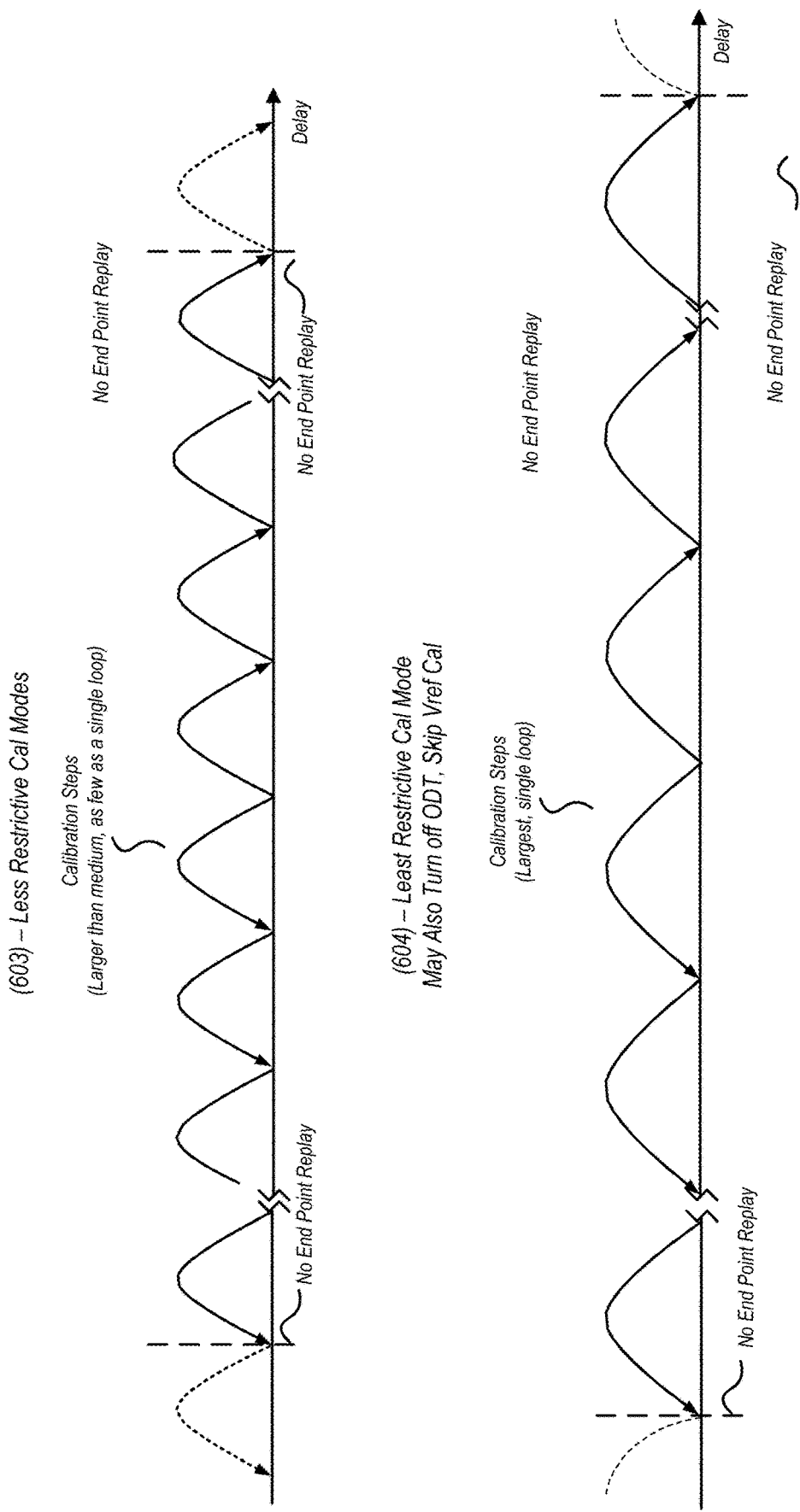
Figure 7:
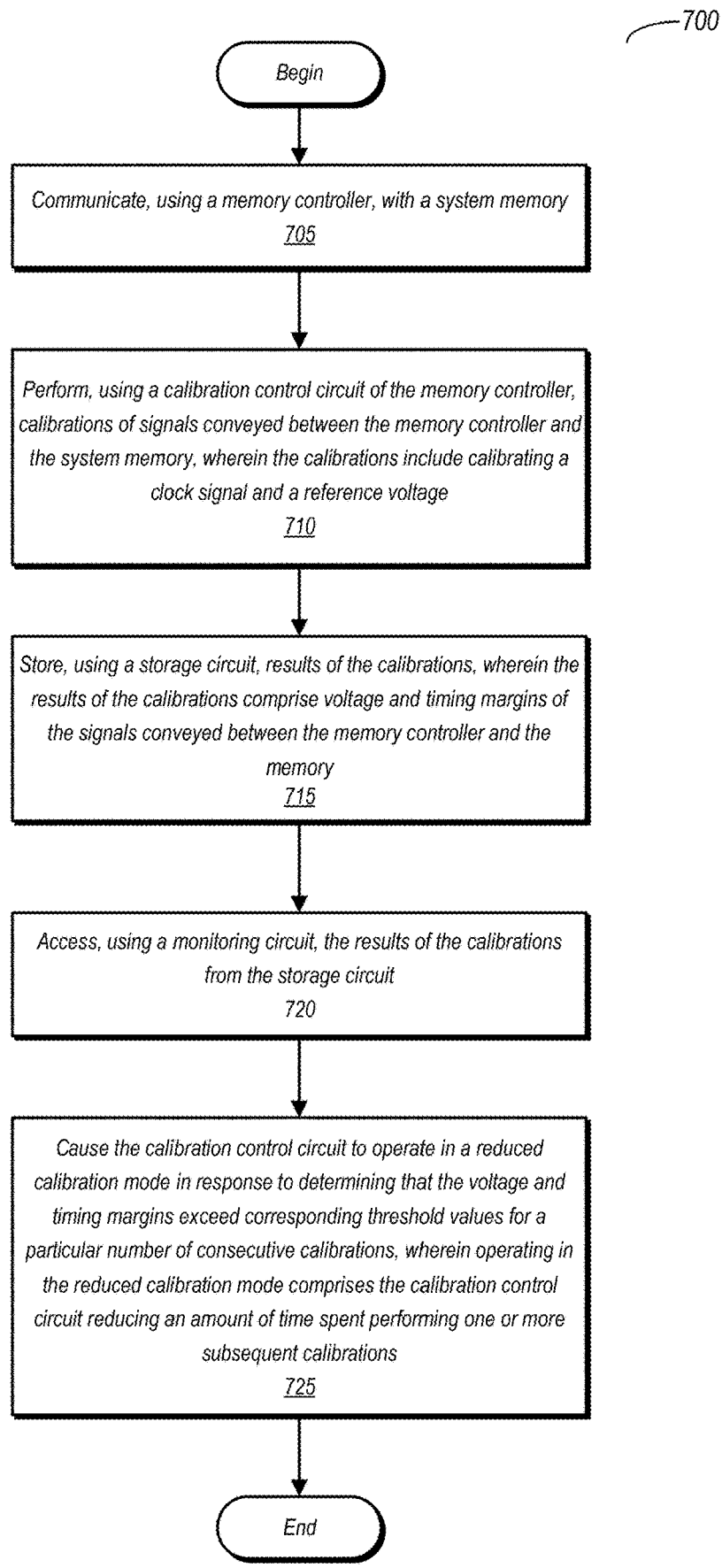
FIG. 7 is a flow diagram of one embodiment of a method for operating a memory controller to carry out calibrations.
Figure 8:
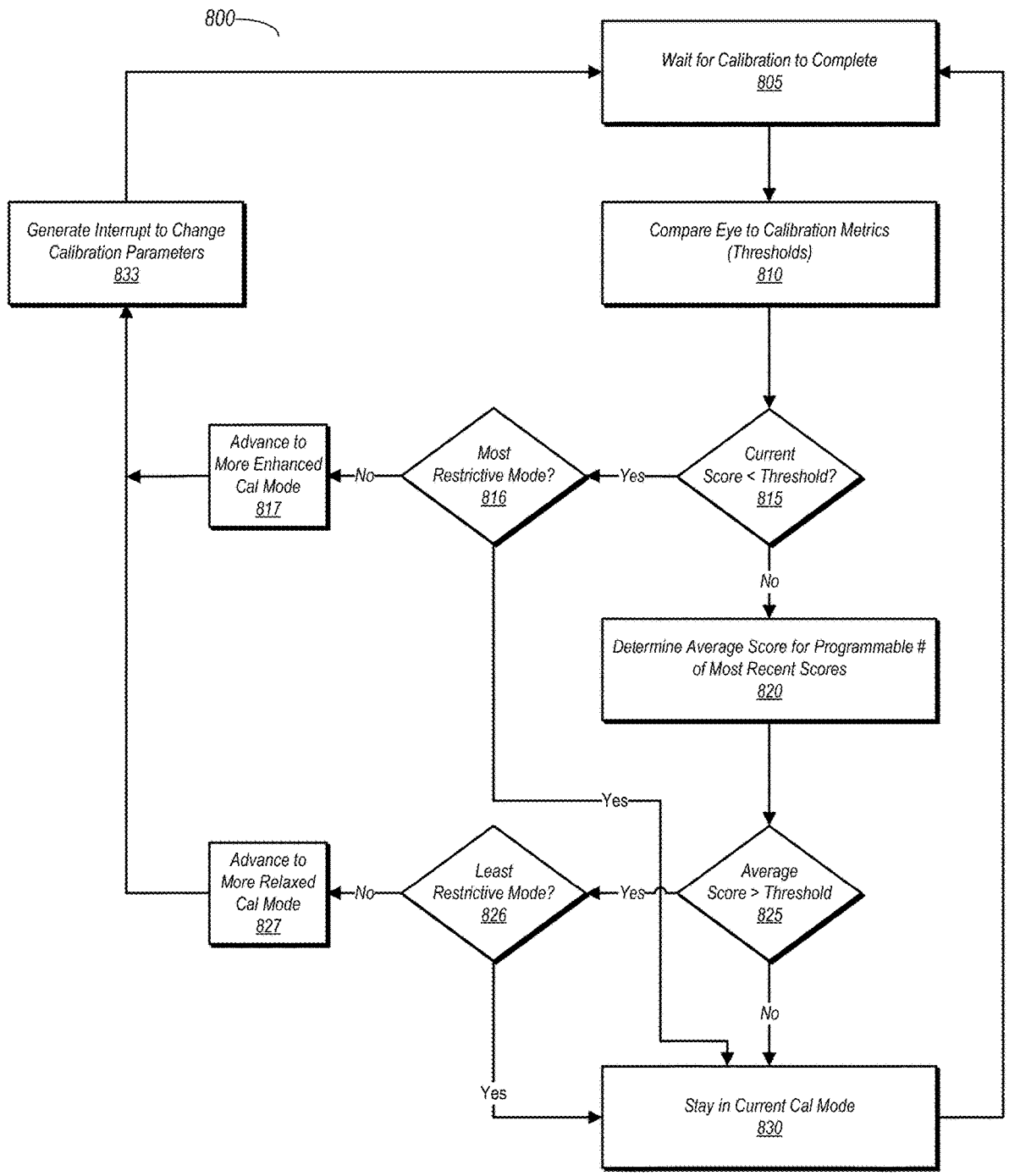
FIG. 8 is a flow diagram of another embodiment of a method for operating a memory controller to carry out calibrations.
Figure 9:
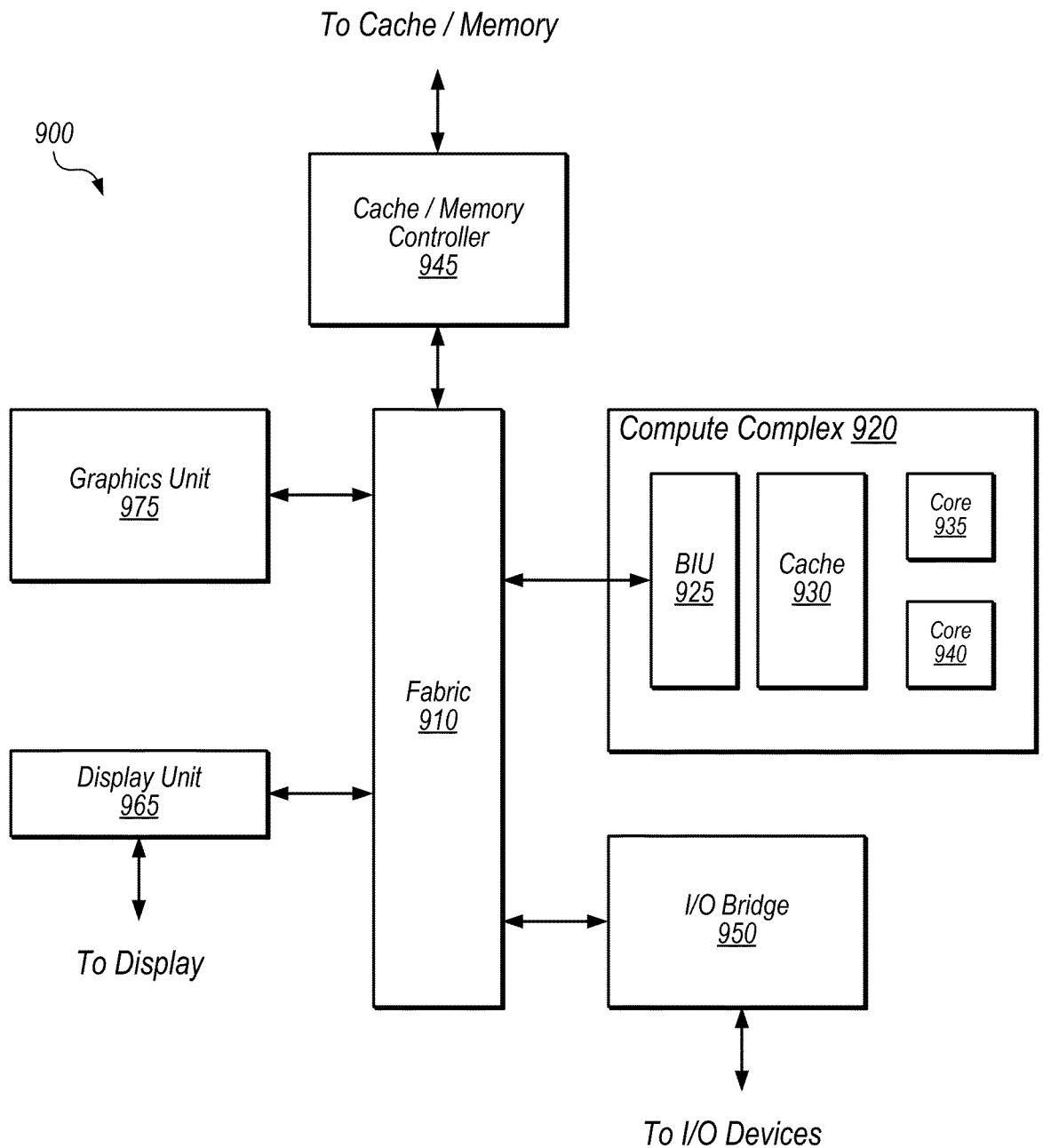
FIG. 9 is a block diagram of one embodiment of an example device which may implement a memory controller according to the disclosure.
Figure 10:
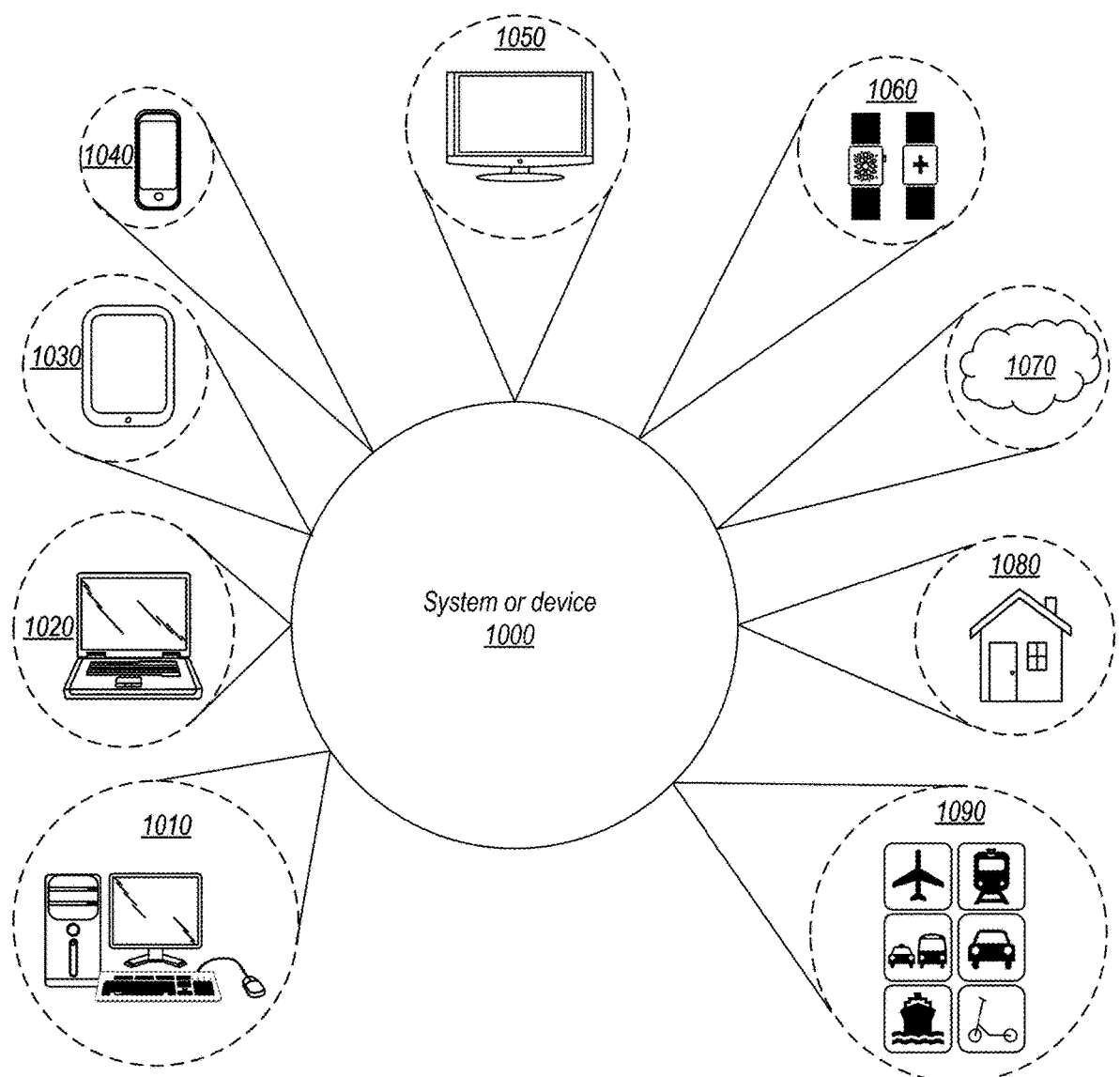
FIG. 10 is a block diagram illustrating example applications of an integrated circuit having a memory controller according to the disclosure.
Figure 11:
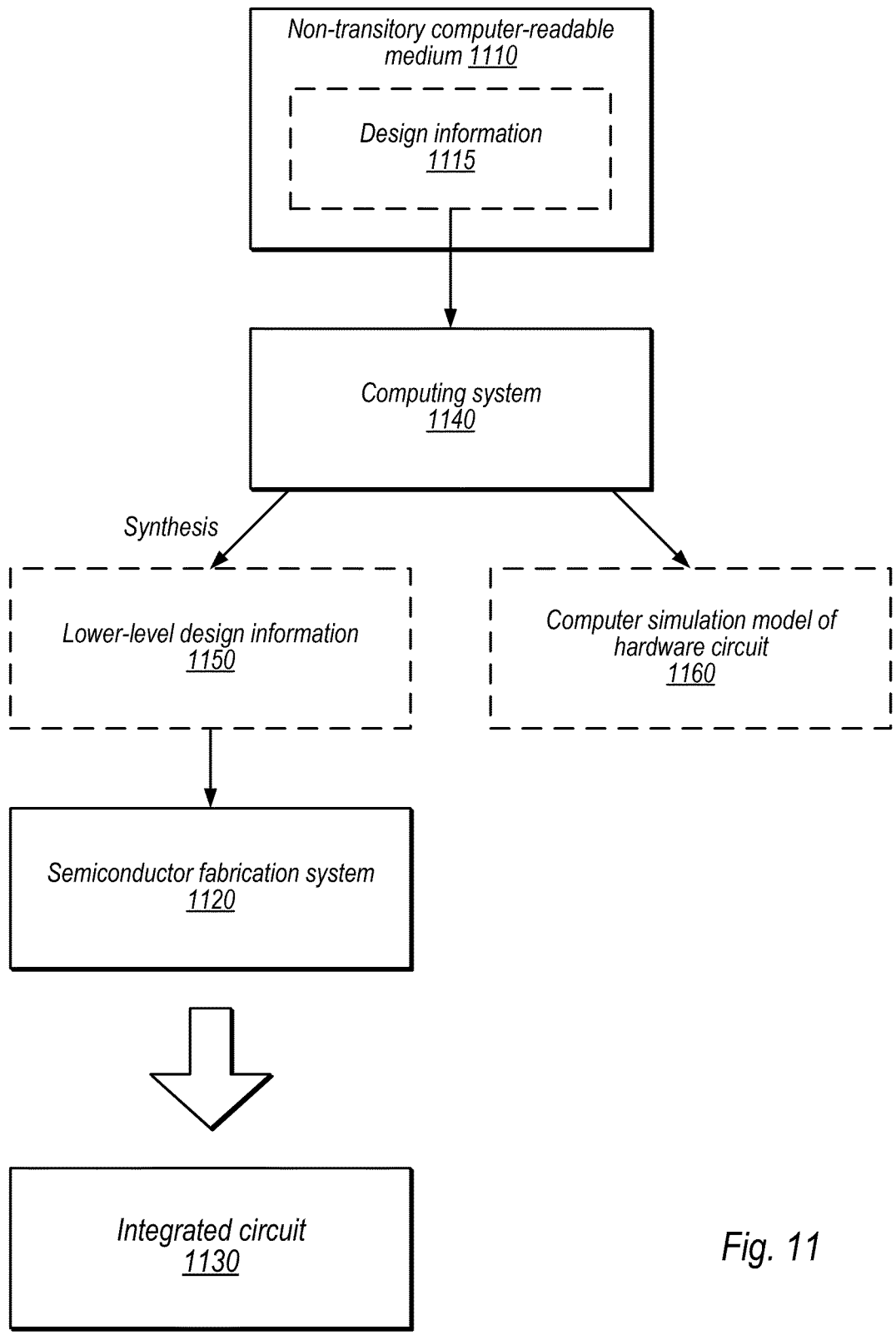
FIG. 11 is a block diagram of one embodiment of a computer readable medium and a manufacturing system capable of manufacturing a circuit including a memory controller according to the disclosure.

Embodiments of a memory controller usable in a memory subsystem capable of carrying out the calibrations with reduced parameters are now discussed in further detail. FIGS. 1 and 2 are directed towards block diagrams illustrating a memory controller and a memory subsystem including the former. FIGS. 3-5 offer additional details with regard to calibration modes available in some embodiments according to the disclosure, including a state diagram that illustrates the conditions for transitioning from one to calibration mode to another. FIGS. 6A-6B illustrate how one particular type of calibration may be carried out in each of a number of different calibration modes. FIGS. 7 and 8 are directed to various methods of operation in accordance with the disclosure. FIG. 9 is directed to a device which may utilize the memory controller of the disclosure, while FIG. 10 illustrates example application of the device. FIG. 11 is a block diagram of a computer readable medium and a fabrication system usable to manufacture a circuit including the memory controller of the present disclosure.

Memory Controller and Memory Subsystem:

FIG. 1 is a block diagram of one embodiment of a memory controller. In the embodiment shown, memory controller 101 includes a monitoring circuit 105, a calibration control circuit 110, and a storage circuit 115.

Calibration control circuit 110 is configured to carry out calibrations of signals that are conveyed between memory controller 101 and a memory that may be coupled thereto. The signals include a clock signal (DQS), that is sometimes referred to as a data strobe signal, along with data signals. The calibrations may be used to determine the timing of the clock signal relative to data signals transferred between the memory and memory controller 101 to ensure sufficient setup and hold time for correctly interpreting data conveyed to and from memory. Calibrations may also be used to determine a voltage, Vref, which are used to evaluate data signals, e.g., whether they are a logic 1 or a logic 0. In performing the voltage and timing calibrations, voltage and timing margins may be determined for the signals. Generally speaking, wider margins correspond to better calibration results.

Calibration control circuit 110 in the embodiment shown may operate in a number of different calibration modes. The calibration modes may be distinguished from one another by a level of restrictiveness and an amount of time consumed performing the calibrations. In more restrictive calibration modes, the calibrations may be more accurate and thus require, e.g., more steps, more iterations (loops), and in general, more time to complete. In less restrictive calibration modes, the calibrations may be less accurate and require, e.g., fewer steps, fewer iterations, and may in general be completed in less time.

Storage circuit 115 is configured to store calibration results generated by calibration control circuit 110. In various embodiments, storage circuit 115 may function as a first-in, first-out storage structure that may store a certain number of previous calibration results. Accordingly, storage circuit 115 in the embodiment shown stores a recent history of calibration results that may be used to determine a calibration mode. When a calibration is performed, its results may be stored into storage circuit 115 by calibration control circuit 110, with the oldest results being evicted.

Monitoring circuit 105 in the embodiment shown is configured to periodically access the results stored in storage circuit 115. Monitoring circuit 105 may keep a running average of the calibration results that are stored in storage circuit 115 and compare this average to a threshold corresponding a one of the various calibration modes in which calibration control circuit 110 is currently operating. The actual number of calibration results that are used to compute this average is programmable in some embodiments, and may thus be less than the storage capacity of storage circuit 115. Monitoring circuit 105 may also compare the results of the most recent calibration to thresholds of the current calibration mode and one or more additional calibration modes.

If the calibration control circuit 110 is operating in a calibration mode that is more restrictive than the least restrictive mode and the running average of recent calibrations is greater than thresholds for that particular mode, monitoring circuit 105 may generate calibration state signals (Cal State) to cause calibration control circuit 110 to move to a less restrictive calibration mode for the next calibration. When the running average is greater than the thresholds, it is an indication that the margins for the considered history have produced results that have margins that are wider than at least the minimum margins, and possibly significantly wider. Accordingly, calibrations that use fewer steps, iterations, etc., and less time may be sufficient.

If the results of the most recently performed calibration do not exceed thresholds (indicating that the margins are less than specified) and the calibration was carried out in a mode that is not the most restrictive mode, monitoring circuit 105 may generate the Cal State signals to cause calibration control circuit 110 to enter a more restrictive calibration mode. In contrast to the conditions for entering a less restrictive mode, monitoring circuit 105 may cause calibration circuit 110 to enter a more restrictive mode based on only a single calibration result in which at least one margin (voltage or timing) is less than a threshold value. Generally speaking, memory controller 101 may operate in a manner that is biased toward quickly moving towards more restrictive calibration modes (due to a single result that fails to meet specification) and more slowly moving toward less restrictive calibration modes (when a number of recent results are better than minimum specifications).

FIG. 2 is a block diagram of one embodiment of a memory subsystem including a memory controller 205 and a memory 210. Memory controller 205 in one embodiment is implemented on an integrated circuit that is separate from memory 210. Memory 210 in may be implemented on, e.g., a memory module comprising a printed circuit board having a number of integrated circuits soldered thereto, including memory chips that provide the actual storage.

Memory controller 205 in the embodiment shown includes a calibration control circuit 206, a physical interface 214, a monitoring circuit 213, a results storage circuit 217, and a reference voltage generator 219. Calibration control circuit 206 in the embodiment shown includes a state machine/control circuit 215 (hereinafter "state machine 215"), an eye circuit 211, and a data comparator 218. Physical interface 214 includes a transceiver 220 and a delay circuit 230. An on-die termination (ODT) circuit 229 is implemented within transceiver 220.

Transceiver 220 in the embodiment shown may transmit data signals (DQ[N–1:0]) to and receive data signals from memory 210. Data signals may be transmitted to memory 210 during write operations and received from memory during read operations. Although not explicitly shown here, physical interface 214 may also include circuitry for transmitting to memory 210 address signals (to indicate memory locations that are the target of the read/write operations) as well as certain control signals (e.g., read enable, write enable, column and/or row address select, and so on). ODT circuit 229 may be activated in at least some performance states to provide termination for the actual signal lines upon which the data signals are conveyed between memory controller 205 and memory 210. This may reduce or eliminate undesired effects, such as signal reflections, that can lead to inter-symbol interference between logic values conveyed on the various signal lines.

Delay circuit 230 in the embodiment shown is configured to transmit, to memory 210, a write data strobe signal (W_DQS) and receiver therefrom a read data strobe (R_DQS). These signals are used to synchronize writes to and reads from memory to ensure that data signals are sampled with sufficient setup and hold time to enable proper reading of their respective values. Delay circuit 230 may generate the read and write data strobes based on a clock signal, Clk_In, received from a source external to memory controller 205. The data strobe signals may be generated by applying respective delays to the input clock signal. In one embodiment, delay circuit 230 may implement first and second delay locked loops (DLLs), one for each of the two data strobes. Other types of delay circuits are possible and contemplated and may be used where suitable. In performing various calibrations, the delay applied to the generated read and write data strobes by delay circuit 230 may be varied in order to find a point at which sampling may be conducted with the widest margins.

An example eye diagram is shown in the upper portion of the drawing, with a sampling point at the approximate middle thereof. Generally, any sampling point within the boundaries defined by both the height (H, corresponding to voltage) and width (W, corresponding to a timing delay) yields a correct interpretation of data. Ideally, data will be sampled at the middle of the eye, yielding the highest possible voltage and timing margins. Accordingly, a calibration carried out may determine the boundaries of the eye and, from that, determine an ideal sampling point. For a given performance state (comprising a frequency of the input clock signal, Clk_In, and a supply voltage, Vdd), an eye diagram will have a minimum width for each of a number of reference voltage values, as well as a minimum height that indicates the range of voltage values for which data can properly be interpreted. As will be discussed in further detail below, the margins obtained in a given iteration of a calibration may be compared to corresponding thresholds to determine if minimums have been met, and if exceeded, by how much. This information can then be used to determine an appropriate calibration mode.

Reference voltage generator 219 in the embodiment shown is a circuit used to generate a reference voltage that is used as a basis for comparing to a received data signal to determine the logic value thereof (e.g., if the signal is a logic 1 or logic 0). Various types of circuits such as bandgap voltage generator circuits may be used to generate this reference voltage. In various embodiments, transceiver 220 may include a number of comparators configured to compare respectively received data signals to the reference voltage to determine corresponding logic values.

Calibrations carried out by calibration control circuit 206 may include horizontal and vertical calibrations. A horizontal calibration is a calibration used to determine timing margins, and may be conducted by performing reads and writes at various delay values for the corresponding data strobe signal for which the calibration is being performed. A given iteration of horizontal calibration may be performed at a designated reference voltage value, and may be used to determine the width of the eye at that voltage. A vertical calibration may be used to determine a range of reference voltage values at which data may be correctly interpreted. The performance of a vertical calibration comprises a number of horizontal calibrations performed at different reference voltage values. Thus, in performing a vertical calibration, a full determination of the height of the eye as well as the width thereof at a number of different reference voltage values may be obtained. After determining the height and width of the eye, a sampling point may be chosen that gives the maximum possible margins for both voltage and timing.

The various calibrations discussed above may be carried out under control of calibration control circuit 206. In carrying out a particular calibration, memory controller 205 may conduct a number of writes of data to memory and reads of data therefrom. Data incoming from memory 210 may be compared in data comparator 218 to expected data. Any failing bits are reported by data comparator 218 to eye circuit 211. A particular read/write performed within a calibration is deemed to have yielded passing results if there are no bit fails. By performing a number of reads and writes at different delay and generating reports of failing bits, eye circuit 211 may determine both the height of the eye as well as its width at each of the reference voltage values for which calibrations were conducted. More generally, eye circuit 211 may determine the boundaries of the eye with both respect to width (timing) and height (voltage). After the boundaries of an eye have been determined in a particular calibration operations, eye circuit 211 may store this information as results into results storage 217.

Eye circuit 211 may set and adjust delay values provided by delay circuit 230 (using the Dly_Ctl signals) during the performance of horizontal calibrations. Similarly, eye circuit 211 may set and adjust the reference voltage value during the performance of vertical calibrations (using the Vref_Adj signals). Furthermore, on completion of a calibration, eye circuit 211 may set the sampling point by choosing particular delay and reference voltage values at which sampling is to be conducted. This point may be chosen based on optimizing the timing and voltage margins.

It is noted that the data used in performing calibrations in some embodiments may be received, via the DQ_In input, from a source external to memory controller 205. However, embodiments in which the calibration data is generated internally to memory controller 205 are possible and contemplated, and thus such embodiments may include appropriate circuitry to carry out this function.

The performance of a particular calibration may be carried out under the control of state machine 215. Among the functions performed by state machine 215 is the selection of an appropriate calibration mode based on the results of one or more previous calibrations. State machine 215 in the embodiment shown may initiate a calibration at various times. In one embodiment, state machine 215 may include internal timing circuitry to cause calibrations to be performed periodically. This periodicity may be adjusted based on results. State machine 215 may also cause calibrations to be performed in response to receiving an indication of a performance state change in which the operating voltage Vdd and the frequency of the input clock signal is to be changed. Calibrations may also be initiated by state machine 215 upon exit from a sleep state or during a system boot or reboot. During a given calibration, state machine 215 may provide control functions to initiate writes of data to and reads of data from memory. State machine 215 may also, when operating in more relaxed calibration modes, cause at least portions of some calibrations performed in a reduced number of steps or to be skipped altogether. For example, when operating in a most relaxed calibration mode when timing margins are particularly large, state machine 215 may cause vertical calibrations to be skipped.

State machine 215 is configured to activate or deactivate ODT circuit 229. When operating in a more restrictive calibration mode (and thus, with smaller margins), ODT circuit 229 may be activated by state machine 215 to provide termination to the signal lines that carry the data between memory controller 205 and memory 210. The termination provided by ODT circuit 229 may comprise one of a number of commonly used active termination circuit configurations. When operating in at least one of the less restrictive calibration modes (when margins are large), state machine 215 may deactivate ODT circuit 229, thereby reducing power consumption by memory controller 205.

State machine 215 in the embodiment shown may also generate control signals provided to the eye circuit 211 (Ctrl_E), data comparator 218 (Ctrl_D), and monitoring circuit 213. These control signals may be used to activate these circuits in preparation for operations to be carried out during a calibration, as well as to indicate when a particular calibration operation is complete. In monitoring circuit 213, these signals may indicate a calibration mode and a performance state that are to be used as a basis to determine if an eye diagram meets specifications.

Monitoring circuit 213 in the embodiment shown may carry out various functions. Among these functions is the evaluation of calibration results with respect to particular thresholds to determine whether the calibration mode set by state machine 215 should remain the same or be changed to a different mode. In one embodiment, monitoring circuit 213 may access results storage 217 to obtain the calibration results. This includes results for a most recent calibration as well as additional result history for a number of previous calibrations (the number may be programmable in some embodiments). Monitoring circuit 213 may generate scores for each result accessed, with the scores varying based on the width and the height of the eye, as well as the rate at which it narrows moving away from a center point. However, embodiments where raw eye data is used as a basis for carrying out the function of monitoring circuit 213 are also possible and contemplated.

Monitoring circuit 213 may use a score (or raw data) from a result of a most recent calibration to compare with a threshold value or values corresponding to a current performance state and current calibration mode. The comparison may determine whether or not the size of the eye meets minimum specifications, as well as an amount by which it deviates therefrom. If, for the most recent calibration result, the comparison indicates that the eye does not meet minimum specifications, monitoring circuit 213 may communicate this result, using the Cal State signal, to the state machine 215. In response, state machine 215 may cause a change of the calibration mode to a more restrictive mode if it is not already in the most restrictive mode. In moving to a more restrictive mode, the calibrations carried out under control of state machine 215 may consume more time and may include more steps than those of the current mode.

In addition to comparing the current calibration result to thresholds, monitoring circuit 213 may compute an average of a number of recent results to determine a running average. This average may be computed using the scores in some embodiments, or using raw eye data in other embodiments. The average may also be compared to threshold values. If this comparison indicates that the running average exceeds the thresholds, indicating that the average margins of the eye are greater than the minimum required value, monitoring circuit 213 may indicate this information to state machine 215, which may respond by changing the calibration mode to a less restrictive calibration state. In moving to a less restrictive calibration mode, calibrations may be carried out using fewer steps and may be completed in less time.

If the comparison of the current calibration results exceeds the minimum thresholds for the current calibration but the running average does not, monitoring circuit 213 may indicate this condition to state machine 215, which in response, will maintain the current calibration mode.

It is noted that, in moving to a less restrictive calibration mode, some embodiments may consider only the running average in making a determination to do so. In contrast, in moving to a more restrictive calibration, these same embodiments may consider only the current result. However, the disclosure does contemplate other factors may be considered as well. Generally speaking, however, the disclosure contemplates moving to a less restrictive calibration mode when it is determined that the results are consistently better than the minimum required results, while a more restrictive calibration mode is entered based on only a single result that is less than required.

It is noted that the thresholds, in addition to varying with the different calibration modes, may also vary from one performance state to the next. As noted above, a performance state is defined herein as a unique combination of a clock frequency and an operating (supply) voltage. Generally speaking, for higher clock frequencies, margins may be smaller, while margins may be higher for lower clock frequencies. Accordingly, thresholds in a given mode may be adjusted in accordance with the performance state. Thus, the changing between different ones of the calibration modes in one performance state, and the conditions for doing so, may be independent of the conditions for changing calibration modes in another one of the performance states.

Calibration Modes and Mode-to-Mode Transitions:

FIG. 3 is a block diagram illustrating different calibration modes for one embodiment of a memory controller according to the disclosure. It is noted that the number of calibration modes in different embodiments may vary, and thus the number shown here is done by way of example without limiting the disclosure. Furthermore, the disclosure contemplates carrying out the operations described herein with as few as two different calibration modes (one restrictive, one relaxed), as well as any desired number of modes greater than two for a given implementation.

In the example shown, there are five different calibration modes. The most restrictive mode is Calibration Mode 1, while Calibration Mode 5 is the least restrictive. Calibration Mode 3 in this embodiment is arranged for power-on reset (POR) parameters, and is the initial calibration mode upon system startup. In one embodiment, when entering a new performance state, the calibration parameters upon entry correspond to the calibration mode used when last in that same performance state. During an initial entry into a performance state, Calibration Mode 3 may be used before any adjustments are made to another state based on one or more calibrations. More restrictive calibration modes may be chosen when the eye size is small and/or decreasing over time. More relaxed calibration modes may be chosen when the eye size is larger and/or increasing over time.

As previously noted, each calibration mode may implement separate thresholds for the different performance states. For example, if the memory subsystem of the disclosure is capable of operating in six different performance states, each of the calibration modes may have six different sets of thresholds, with the currently used set based on the current performance state.

The relaxing of calibration parameters as the width of the eye increases may be carried out in a number of ways. For example, the number of steps used to perform a particular calibration may be reduced in the more relaxed calibration modes relative to those that are more restricted. This may include increasing the step size. Elimination of extra calibration steps involved with an end point replay procedure (explained in further detail below) may also be carried out. In more relaxed calibration modes, the interval between calibrations may also be increased, thereby reducing the number of calibrations performed over a given time period. In relaxed modes, a binary scan may be performed in lieu of a full scan, the latter of which sweeps a delay value across an entire range of values to determine the width of the eye. In the most relaxed calibration modes, when the eye is significantly wider than minimum specified values, some calibrations may be skipped altogether. For example in a calibration mode with the most relaxed parameters of all available modes, a reference voltage calibration may be skipped entirely. The disclosure contemplates other mechanisms not explicitly discussed herein. In general, any mechanism to reduce the time spent performing calibration and/or to reduce the power consumed in performing calibrations is contemplated and falls within the scope of this disclosure. With regard to power, ODT circuits implementing active termination may be turned off in one or more of the relaxed calibration modes (as well as during normal, non-calibration operations) to realize additional power savings.

FIG. 4 is a table illustrating details of a plurality of calibration modes in which memory calibrations may be carried out by one embodiment of a memory controller. Table 400 provides an example of operations that may be carried out in performing horizontal calibrations in different calibration modes in one embodiment of a memory controller. Since a vertical calibration comprises a series of horizontal calibrations at different reference voltages, the operations may be extended thereto.

In the example shown, Table 400 includes five different calibration modes, each of which corresponds to the width of an eye relative to at least one threshold, which may represent a nominal width value. Calibration Mode 1 in this example is the most restrictive, with the eye being significantly narrower than a threshold T1. In this mode, a loop count is 2, meaning that at a given reference voltage, the same horizontal calibration is carried out twice. Calibration Mode 1 as shown here also includes eight iterations of end point replay, which is a methodology to more accurately determine end points of an eye (and which will be discussed in further detail below with reference to FIGS. 6A-6B). A step size of 1 is used in this mode, while ODT is turned on. Additionally, vertical (reference voltage) calibrations are performed in this mode. The type of horizontal calibration performed in this mode is a full scan in which delays are swept across a range of values, with write/read/compare operations performed at each point. In Calibration Mode 1, calibration times and accuracy are increased relative to the other modes, with higher loop counts and additional iterations of end point replay. In Calibration Mode 1, the calibrations may consume more time and more power than those conducted in other ones of the available modes, leading to greater accuracy but at the expense of greater amount of memory unavailability.

Calibration Mode 5 in the embodiment shown is the most relaxed of those available. In this mode, the width of the eye is significantly larger than a threshold T2. For this mode, the loop count is 1, and no end point replay is performed with the horizontal calibrations. Step sizes are larger than the other modes. With regard to a horizontal calibration, a binary scan may be carried out instead of a full scan. In a binary scan, the delay may be adjusted in an iterative manner in which the delay values are adjusted to find the approximate end points of the eye. Since entry and remaining in this mode occurs when timing margins high and significantly greater than minimums, less accurate determination of the end points may be tolerated. Additionally, in this mode, Vref calibrations may be skipped with ODT may be turned off. Thus, in Calibration Mode 5, less time may be spent carrying out memory calibrations, resulting in greater memory availability. Furthermore, since calibration time is reduced, the amount of power consumed in performing calibrations also undergoes a corresponding reduction.

As with the example of FIG. 3, Calibration Mode 3 in Table 400 corresponds to POR calibration parameters, and may be used, e.g., upon system startup. This mode may also be used when the width of the eye is greater than the first threshold T1, but less than the second threshold T2. In this calibration mode, only a single loop is performed, with no end point replay, and using a binary scan for the horizontal calibration type. Reference voltage calibrations are performed in this mode, with ODT turned on. Calibration Mode 2 in the embodiment shown involves more restrictive calibration parameters than Calibration Mode 3, while Calibration Mode 4 involves less restrictive parameters.

FIG. 5 is a state diagram illustrating operation of one embodiment of a memory controller capable of performing calibrations in various ones of a plurality of calibration modes. State diagram 500 in the embodiment shown illustrates the conditions for transitioning between one calibration mode and another based on calibration results. The operation depicted by state diagram 500 may be carried out by state machine 215 of FIG. 2 in one embodiment.

When operating in any of Calibration Modes 2-5, a single instance of a calibration that does meet specifications (e.g., the margins, or width of the eye for that calibration is less than a particular threshold), the mode may be transitioned to a more restrictive mode for the next calibration. In some embodiments, the change of mode may be to move to an adjacent, more restrictive calibration mode. However, embodiments are possible and contemplated in which the calibration mode moves more than one mode. For example, in response to a calibration that does not meet the minimum threshold when operating in Calibration Mode 5, a transition to one of Calibration Modes 3, 2, or 1 may be performed instead of moving to Calibration Mode 4. The particular mode selected in such a transition may depend on the difference between the width of the eye (or score) and the threshold used as a basis of comparison. Larger differences may correspond to a larger jump between calibration modes.

When operating in any of Calibration Modes 1-4 in the embodiment shown, a series of consecutive calibration results wherein the margins/eye width/score exceed a corresponding threshold may result in a transition to a mode having more relaxed calibration parameters. For example, if operating in Calibration Mode 2, and the average result for N consecutive calibrations exceeds a particular threshold value, operation may transition to an adjacent calibration mode having less restrictive parameters. The value N is an integer value, and in some embodiments, may be programmable.

Operation remains in Calibration Mode 1, with the most restrictive parameters, any time a calibration result does not meet the minimum thresholds, or the average of the N most recent results is less than a threshold, operation in Calibration Mode 1 continues. Operation exits Calibration Mode 1, and transitions to Calibration Mode 2, when the average calibration result exceeds thresholds over N consecutive calibrations.

Operation remains in Calibration Mode 5 as long as calibration results exceed thresholds. Operation exits Calibration Mode 5 upon a single calibration result failing to exceed the minimums specified by the corresponding threshold. In some embodiments, an exit from Calibration Mode 5 may always results in a transition to Calibration Mode 4. In other embodiments, an exit from Calibration Mode 5 may result in a transition to any other one of the calibration modes, depending on a difference between the most recent calibration result and the thresholds (e.g., an amount by how much the margin/score failed to meet the minimum specifications).

When operating in any of Calibration Modes 2, 3, and 4, operation may remain in the current mode when the most recent calibration result exceeds thresholds, but the average of the most recent N consecutive calibrations does not exceed thresholds. In any of these modes, a single calibration result that does not meet minimum specifications (less than a threshold) causes a transition to a calibration mode with more restrictive parameters. When operating in any Calibration Modes 2, 3, or 4, a transition to an adjacent calibration mode with more relaxed calibration parameters may result if the average of the N most recent calibration results exceeds a corresponding threshold.

Example of Horizontal Calibration in Different Modes:

FIGS. 6A-6B illustrate details with regard to the variation of certain calibrations performed in different modes for one embodiment of a memory controller. In particular, these figures illustrate various full scan horizontal calibrations that may be conducted in an embodiment of a memory controller according to the disclosure, starting with a most restrictive mode and progressing to a least restrictive mode.

In FIG. 6A, calibration 601 is carried out in a most restrictive one of the available calibration modes. The calibration comprises a full scan in which read/write/compare operations are conducted at a number of different delay values to determine end points of the delay range (and thus, the width of the eye at that particular reference voltage). This calibration uses the smallest step size of the examples in FIGS. 6A-6B. Furthermore, a loop count (a number of times the scan is conducted) may be greater for this calibration mode than any of the others. The smaller step sizes and additional loops require requiring more read/write/compare cycles, and thus calibration in this mode consumes more time and more power than more relaxed modes. This mode may be used when calibration results indicate small margins.

Additionally, calibration 601 of FIG. 6A uses end point replay. Initial upper and lower end points of the eye may be determined by the initial calibration. An end point marks the point in a range of delay value between a last fully passing value (all bits match expected values) and one in which one or more bits fail (one or more bits do not match expected values). After locating the two initial end points, additional steps are performed in a range surrounding each. The sizes for these steps may be even smaller than those for the other portion of the calibration, thereby increasing accuracy. Using end point replay, final upper and lower end points of the eye are found for the particular voltage at which the horizontal calibration is conducted. These end points may enable a more accurate determination of the eye width at the particular voltage, at the expense of additional time.

Calibration 602 also involves a full scan. However, for this horizontal calibration, the step size may be larger, while the loop count may be smaller than that of the calibration depicted in calibration 601. Furthermore, no end point replay is conducted in this particular mode. Accordingly, calibrations conducted in this mode may be less accurate than those corresponding of calibration 601, but may be completed in less time and with less power consumption. This mode may be used when calibration results indicate sufficient margins but still require a reasonable amount of accuracy.

Calibration 603 of FIG. 6B utilizes even larger steps than that of FIG. 6B. Accordingly, fewer calibration steps are used to carry out the calibration. Furthermore, the loop count may be reduced to as low as a single loop at each reference voltage. Calibration 603 is also carried out with no end point replay. This further reduces the time and power consumed in performing a calibration relative to calibrations 601 and 602, although the accuracy is less. This reduced accuracy may be tolerated, as operation in the mode that performs a calibration such as that shown here occurs when results indicate relatively wide margins.

Calibration 604 of FIG. 6B is an example of a calibration performed in a least restrictive calibration mode of those shown in these examples. In this calibration, step sizes are larger than those the three previously discussed calibrations, resulting in further reduction of the number of read/write/compare cycles. This number may be even further reduced by the elimination of a vertical calibration in this mode. This calibration is also conducted without end point replay. A calibration of this type may be utilized in a least restrictive mode when margins are significantly greater than the necessary minimum. When operating in a mode similar to that depicted in FIG. 6B, calibrations may be completed in a minimum of time and with a minimum of power consumption. Accordingly, memory availability is greater, while power consumption is directed more to system performance.

Methods of Operation:

FIG. 7 is a flow diagram of one embodiment of a method for operating a memory controller. Method 700 may be carried out by various embodiments of the hardware/circuits discussed above. Embodiments of a memory controller not explicitly discussed herein but otherwise capable of carrying out Method 700 are also considered to fall within the scope of this disclosure.

Method 700 includes communicating, using a memory controller, with a system memory (block 705). The method further includes performing, using a calibration control circuit of the memory controller, calibrations of memory signals conveyed between the memory controller and the system memory, wherein the calibrations include calibrating a clock signal and a reference voltage (block 710), and storing, using a storage circuit, results of the calibrations, wherein the results of the calibrations comprise voltage and timing margins of the memory signals conveyed between the memory controller and the memory (block 715). The method also includes accessing, using a monitoring circuit, the results of the calibrations from the storage circuit (block 720). Method 700 of the present embodiment also includes causing the calibration control circuit to operate in a reduced calibration mode in response to determining that the voltage and timing margins exceed corresponding threshold values for a particular number of consecutive calibrations, wherein operating in the reduced calibration mode comprises the calibration control circuit reducing an amount of time spent performing one or more subsequent calibrations (block 725).

In various embodiments, the method includes the monitoring circuit causing an exit from the reduced calibration mode in response to one instance of a calibration wherein at least one of the voltage and timing margins is less than its corresponding threshold value. Some embodiments of the method also include operating the calibration control circuit in one of plurality of calibration modes including first, second, and third calibrations modes, wherein a particular one of the plurality of calibration modes has respective calibration parameters with a different level of restrictiveness with respect to other ones of the plurality of calibration modes, wherein the respective calibration parameters include corresponding threshold values. These embodiments may also include causing the calibration control circuit, using the monitoring circuit, to operate in the first one of the plurality of calibration modes for a first plurality of calibrations in which voltage and timing margins exceed corresponding threshold values for a first plurality of consecutive calibrations. Such embodiments may also include causing the calibration control circuit, using the monitoring circuit, to operate in a second one of the plurality of calibration modes for a second plurality of calibrations in which voltage and timing margins exceed corresponding threshold values for a second plurality of consecutive calibrations, and causing the calibration control circuit, using the monitoring circuit, to operate in a third one of the plurality of calibration modes in response to voltage and timing margins exceeding the corresponding threshold values for the second plurality of consecutive calibrations. Calibration parameters for the second one of the plurality of calibration modes are less restrictive than those of the first one of the plurality of calibration modes. Calibration parameters for the third one of the plurality of calibration modes are less restrictive than those of the second one of the plurality of calibration modes.

In various embodiments, reducing an amount of time spent performing the one or more subsequent calibrations comprises one or more of the following: increasing a calibration step size, increasing a time interval between calibrations, skipping a reference voltage calibration, and/or decreasing a number of calibration loops performed in carrying out at least one instances of the calibration. Embodiments of Method 700 may also include disabling an on-die termination circuit when operating in the reduced calibration mode.

FIG. 8 is a flow diagram of another embodiment of a method for operation a memory controller in carrying out calibrations according to the disclosure. Method 800 may be carried out by various embodiments of the hardware/circuitry discussed above. Embodiments capable of carrying out Method 800 but not otherwise disclosed herein are also considered to fall within the scope of this disclosure.

Method 800 begins during a calibration, waiting for the current calibration to complete (block 805). The calibration may be conducted in one of a number of different calibration modes, some of which may be less restrictive than others, and which may thus require less time to complete than others. After the current calibration completes, the results thereof are converted into a score that are indicative of an eye diagram, with the scores being compared to calibration metrics, or thresholds (block 810). If the score is less than a threshold (block 815, yes) and the memory controller is operating in the most restricted calibration mode (block 816, yes), then operation remains in the current calibration mode (block 830), after which Method 800 returns to block 805 when another calibration commences. If the current score is less than a threshold (block 815, yes) and the memory controller is not operating in the most restrictive calibration mode (block 816, no), then operation will advance to a more enhanced (more restrictive parameters) calibration mode (block 817). This causes an interrupt to be generated to change the calibration parameters (block 833), after which the method returns to block 805 after another calibration commences.

If the current score is not less than the threshold (block 815, no), an average score for a programmable number of most recent scores is determine (block 820). If this average score is greater than a threshold (indicating that calibration results are exceeding required margins; block 825, yes), and the memory controller is not operating in the least restrictive calibration mode (block 826, no), then the mode may be advanced to a more relaxed (less restrictive parameters) calibration mode (block 827). Again, and interrupt may be generated to change the calibration parameters (block 833), after which the method returns to block 805 after another calibration commences. If the average score is greater than the threshold (block 825, yes), but the memory controller is already operating in the least restrictive calibration mode (block 826, yes), then operation remains in the current calibration state at block 830, after which the method returns to block 805 after another calibration commences. Similarly, if the average score does not exceed the threshold for the programmable number of most recent scores (block 825, no), operation again remains in the current calibration state at block 830, after which the method returns to block 805 after another calibration commences.

Example Device:

Referring now to FIG. 9, a block diagram illustrating an example embodiment of a device 900 is shown. In some embodiments, elements of device 900 may be included within a system on a chip. In some embodiments, device 900 may be included in a mobile device, which may be battery-powered. Therefore, power consumption by device 900 may be an important design consideration. In the illustrated embodiment, device 900 includes fabric 910, compute complex 920, input/output (I/O) bridge 950, cache/memory controller 945, graphics unit 975, and display unit 965. In some embodiments, device 900 may include other components (not shown) in addition to or in place of the illustrated components, such as video processor encoders and decoders, image processing or recognition elements, computer vision elements, etc.

Fabric 910 may include various interconnects, buses, MUX's, controllers, etc., and may be configured to facilitate communication between various elements of device 900. In some embodiments, portions of fabric 910 may be configured to implement various different communication protocols. In other embodiments, fabric 910 may implement a single communication protocol and elements coupled to fabric 910 may convert from the single communication protocol to other communication protocols internally.

In the illustrated embodiment, compute complex 920 includes bus interface unit (BIU) 925, cache 930, and cores 935 and 940. In various embodiments, compute complex 920 may include various numbers of processors, processor cores and caches. For example, compute complex 920 may include 1, 2, or 4 processor cores, or any other suitable number. In one embodiment, cache 930 is a set associative L2 cache. In some embodiments, cores 935 and 940 may include internal instruction and data caches. In some embodiments, a coherency unit (not shown) in fabric 910, cache 930, or elsewhere in device 900 may be configured to maintain coherency between various caches of device 900. BIU 925 may be configured to manage communication between compute complex 920 and other elements of device 900. Processor cores such as cores 935 and 940 may be configured to execute instructions of a particular instruction set architecture (ISA) which may include operating system instructions and user application instructions. These instructions may be stored in computer readable medium such as a memory coupled to memory controller 945 discussed below.

As used herein, the term "coupled to" may indicate one or more connections between elements, and a coupling may include intervening elements. For example, in FIG. 9, graphics unit 975 may be described as "coupled to" a memory through fabric 910 and cache/memory controller 945. In contrast, in the illustrated embodiment of FIG. 9, graphics unit 975 is "directly coupled" to fabric 910 because there are no intervening elements.

Cache/memory controller 945 may be configured to manage transfer of data between fabric 910 and one or more caches and memories. For example, cache/memory controller 945 may be coupled to an L3 cache, which may in turn be coupled to a system memory. In other embodiments, cache/memory controller 945 may be directly coupled to a memory. In some embodiments, cache/memory controller 945 may include one or more internal caches. Memory coupled to controller 945 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 945 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by compute complex 920 to cause the computing device to perform functionality described herein.

In addition to the above, cache/memory controller 945 may include circuitry for carrying out calibrations in accordance with the discussion above with reference to FIGS. 1-8. This may include circuitry that adjusts a calibration mode based on results to reduce calibration time where possible.

Graphics unit 975 may include one or more processors, e.g., one or more graphics processing units (GPUs). Graphics unit 975 may receive graphics-oriented instructions, such as OPENGL®, Metal®, or DIRECT3D® instructions, for example. Graphics unit 975 may execute specialized GPU instructions or perform other operations based on the received graphics-oriented instructions. Graphics unit 975 may generally be configured to process large blocks of data in parallel and may build images in a frame buffer for output to a display, which may be included in the device or may be a separate device. Graphics unit 975 may include transform, lighting, triangle, and rendering engines in one or more graphics processing pipelines. Graphics unit 975 may output pixel information for display images. Graphics unit 975, in various embodiments, may include programmable shader circuitry which may include highly parallel execution cores configured to execute graphics programs, which may include pixel tasks, vertex tasks, and compute tasks (which may or may not be graphics-related).

Display unit 965 may be configured to read data from a frame buffer and provide a stream of pixel values for display. Display unit 965 may be configured as a display pipeline in some embodiments. Additionally, display unit 965 may be configured to blend multiple frames to produce an output frame. Further, display unit 965 may include one or more interfaces (e.g., MIPI® or embedded display port (eDP)) for coupling to a user display (e.g., a touchscreen or an external display).

I/O bridge 950 may include various elements configured to implement: universal serial bus (USB) communications, security, audio, and low-power always-on functionality, for example. I/O bridge 950 may also include interfaces such as pulse-width modulation (PWM), general-purpose input/output (GPIO), serial peripheral interface (SPI), and inter-integrated circuit (I2C), for example. Various types of peripherals and devices may be coupled to device 900 via I/O bridge 950.

In some embodiments, device 900 includes network interface circuitry (not explicitly shown), which may be connected to fabric 910 or I/O bridge 950. The network interface circuitry may be configured to communicate via various networks, which may be wired, wireless, or both. For example, the network interface circuitry may be configured to communicate via a wired local area network, a wireless local area network (e.g., via Wi-Fi™), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth® or Wi-Fi™ Direct), etc. In various embodiments, the network interface circuitry may provide device 900 with connectivity to various types of other devices and networks.

Example Applications:

Turning now to FIG. 10, various types of systems that may include any of the circuits, devices, or system discussed above. System or device 1000, which may incorporate or otherwise utilize one or more of the techniques described herein, may be utilized in a wide range of areas. For example, system or device 1000 may be utilized as part of the hardware of systems such as a desktop computer 1010, laptop computer 1020, tablet computer 1030, cellular or mobile phone 1040, or television 1050 (or set-top box coupled to a television).

Similarly, disclosed elements may be utilized in a wearable device 1060, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1000 may also be used in various other contexts. For example, system or device 1000 may be utilized in the context of a server computer system, such as a dedicated server or on shared hardware that implements a cloud-based service 1070. Still further, system or device 1000 may be implemented in a wide range of specialized everyday devices, including devices 1080 commonly found in the home such as refrigerators, thermostats, security cameras, etc. The interconnection of such devices is often referred to as the "Internet of Things" (IoT). Elements may also be implemented in various modes of transportation. For example, system or device 1000 could be employed in the control systems, guidance systems, entertainment systems, etc. of various types of vehicles 1090.

The applications illustrated in FIG. 10 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium:

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that programs a computing system to generate a simulation model of the hardware circuit, programs a fabrication system configured to produce hardware (e.g., an integrated circuit) that includes the disclosed circuitry, etc. Claims to such a storage medium are intended to cover, for example, an entity that produces a circuit design, but does not itself perform complete operations such as: design simulation, design synthesis, circuit fabrication, etc.

FIG. 11 is a block diagram illustrating an example non-transitory computer-readable storage medium that stores circuit design information, according to some embodiments. In the illustrated embodiment, computing system 1140 is configured to process the design information. This may include executing instructions included in the design information, interpreting instructions included in the design information, compiling, transforming, or otherwise updating the design information, etc. Therefore, the design information controls computing system 1140 (e.g., by programming computing system 1140) to perform various operations discussed below, in some embodiments.

In the illustrated example, computing system 1140 processes the design information to generate both a computer simulation model of a hardware circuit 1160 and lower-level design information 1150. In other embodiments, computing system 1140 may generate only one of these outputs, may generate other outputs based on the design information, or both. Regarding the computing simulation, computing system 1140 may execute instructions of a hardware description language that includes register transfer level (RTL) code, behavioral code, structural code, or some combination thereof. The simulation model may perform the functionality specified by the design information, facilitate verification of the functional correctness of the hardware design, generate power consumption estimates, generate timing estimates, etc.

In the illustrated example, computing system 1140 also processes the design information to generate lower-level design information 1150 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on lower-level design information 1150 (potentially among other inputs), semiconductor fabrication system 1120 is configured to fabricate an integrated circuit 1130 (which may correspond to functionality of the simulation model 1160). Note that computing system 1140 may generate different simulation models based on design information at various levels of description, including information 1150, 1115, and so on. The data representing design information 1150 and model 1160 may be stored on medium 1110 or on one or more other media.

In some embodiments, the lower-level design information 1150 controls (e.g., programs) the semiconductor fabrication system 1120 to fabricate the integrated circuit 1130. Thus, when processed by the fabrication system, the design information may program the fabrication system to fabricate a circuit that includes various circuitry disclosed herein.

Non-transitory computer-readable storage medium 1110, may comprise any of various appropriate types of memory devices or storage devices. Non-transitory computer-readable storage medium 1110 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1110 may include other types of non-transitory memory as well or combinations thereof. Accordingly, non-transitory computer-readable storage medium 1110 may include two or more memory media; such media may reside in different locations—for example, in different computer systems that are connected over a network.

Design information 1115 may be specified using any of various appropriate computer languages, including hardware description languages such as, without limitation: VHDL, Verilog, SystemC, System Verilog, RHDL, M, MyHDL, etc. The format of various design information may be recognized by one or more applications executed by computing system 1140, semiconductor fabrication system 1120, or both. In some embodiments, design information may also include one or more cell libraries that specify the synthesis, layout, or both of integrated circuit 1130. In some embodiments, the design information is specified in whole or in part in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 1130 may, in various embodiments, include one or more custom macrocells, such as memories, analog or mixed-signal circuits, and the like. In such cases, design information may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 1120 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1120 may also be configured to perform various testing of fabricated circuits for correct operation.

In various embodiments, integrated circuit 1130 and model 1160 are configured to operate according to a circuit design specified by design information 1115, which may include performing any of the functionality described herein. For example, integrated circuit 1130 may include any of various elements shown in FIGS. 1 and 2 and operate in accordance with any of the functions discussed with reference to FIGS. 1-8 . . . . Further, integrated circuit 1130 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model" does not imply that the instructions must be executed in order for the element to be met, but rather specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. As one example, different designs may select or connect gates based on design tradeoffs (e.g., to focus on power consumption, performance, circuit area, etc.). Further, different manufacturers may have proprietary libraries, gate designs, physical gate implementations, etc. Different entities may also use different tools to process design information at various layers (e.g., from behavioral specifications to physical layout of gates).

Once a digital logic design is specified, however, those skilled in the art need not perform substantial experimentation or research to determine those implementations. Rather, those of skill in the art understand procedures to reliably and predictably produce one or more circuit implementations that provide the function described by the design information. The different circuit implementations may affect the performance, area, power consumption, etc. of a given design (potentially with tradeoffs between different design goals), but the logical function does not vary among the different circuit implementations of the same circuit design.

In some embodiments, the instructions included in the design information instructions provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information. The lower-level design information may program fabrication system 1120 to fabricate integrated circuit 1130.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112 (f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. An apparatus comprising:
a memory controller configured to communicate with a memory, wherein the memory controller includes:
a calibration control circuit configured to perform calibrations of memory signals conveyed between the memory controller and the memory;
a storage circuit configured to store results of the calibrations, including voltage and timing margins of one or more of the memory signals; and
a monitoring circuit configured to:
access results of the calibrations stored in the storage circuit to determine whether a set of calibration metrics are being met or exceeded during a period of time;
in response to the set of calibration metrics being met or exceeded during the period of time, cause the calibration control circuit to operate in a reduced calibration mode that reduces an amount of time the calibration control circuit spends performing one or more subsequent calibrations; and
cause the calibration control circuit to exit the reduced calibration mode in response to an instance of a calibration wherein at least one of the voltage and timing margins is less than its corresponding threshold value.

2. The apparatus of claim 1, wherein the calibration control circuit is configured to operate in one of a plurality of calibration modes, wherein a particular one of the plurality of calibration modes has respective calibration parameters with a different level of restrictiveness with respect to other ones of the plurality of calibration modes, wherein the respective calibration parameters include corresponding threshold values.

3. The apparatus of claim 2, wherein the monitoring circuit is configured to, when the calibration control circuit is operating in one of the plurality of calibration modes having a first level of restrictiveness greater than a second level of restrictiveness, cause the calibration control circuit to begin operating in another one of the plurality of calibration modes having the second level of restrictiveness in response to determining that the voltage and timing margins exceed corresponding threshold values of the first level of restrictiveness for a particular number of consecutive calibrations.

4. The apparatus of claim 3, wherein the monitoring circuit is configured to, when the calibration control circuit is operating in one of the plurality of calibration modes having the second level of restrictiveness, cause the calibration control circuit to begin operating in one of the plurality of calibration modes having a third level of restrictiveness in response to determining that the voltage and timing margins exceed corresponding threshold values of the second level of restrictiveness for the particular number of consecutive calibrations, wherein the second level of restrictiveness is greater than the third level of restrictiveness.

5. The apparatus of claim 2, wherein the calibration control circuit is configured to perform a calibration for a first performance state in a different one of the calibration modes from a calibration performed in a second one of a second performance state, wherein the first and second performance states comprise respective clock frequencies at which a memory subsystem operates, the memory subsystem including the memory controller and the memory.

6. The apparatus of claim 2, wherein the calibration control circuit is configured to change between ones of the plurality of calibration modes when operating in a first performance state independently of changing between ones of the plurality of calibration modes when operating in a second performance state.

7. The apparatus of claim 2, wherein, upon a system startup, the calibration control circuit is configured to carry out at least one calibration in a first one of the plurality of calibration modes, wherein calibration parameters for the first one of the plurality of calibration modes are less restrictive than calibrations for a second one of the plurality of calibration modes and more restrictive than calibration parameters for a third one of the plurality of calibration modes.

8. The apparatus of claim 1, wherein the calibration control circuit is configured to reduce the amount of time spent performing the one or more subsequent calibrations by performing one or more of the following:
increasing a calibration step size;
increasing a time interval between calibrations;
skipping a reference voltage calibration;
decreasing a number of calibration loops performed in carrying out at least one instance of the calibration.

9. The apparatus of claim 1, wherein the calibration control circuit is further configured to disable an on-die termination circuit when operating in the reduced calibration mode.

10. A method comprising:
communicating, using a memory controller, with a system memory;
performing, using a calibration control circuit of the memory controller, calibrations of memory signals conveyed between the memory controller and the system memory, wherein the calibrations include calibrating a clock signal and a reference voltage;
storing, using a storage circuit, results of the calibrations, wherein the results of the calibrations comprise voltage and timing margins of the memory signals conveyed between the memory controller and the memory;
accessing, using a monitoring circuit, the results of the calibrations from the storage circuit; and
causing the calibration control circuit to operate in a reduced calibration mode in response to determining that the voltage and timing margins exceed corresponding threshold values for a particular number of consecutive calibrations, wherein operating in the reduced calibration mode comprises the calibration control circuit reducing an amount of time spent performing one or more subsequent calibrations.

11. The method of claim 10, further comprising the monitoring circuit causing an exit from the reduced calibration mode in response to one instance of a calibration wherein at least one of the voltage and timing margins is less than its corresponding threshold value.

12. The method of claim 10, further comprising operating the calibration control circuit in one of a plurality of calibration modes including first, second, and third calibration modes, wherein a particular one of the plurality of calibration modes has respective calibration parameters with a different level of restrictiveness with respect to other ones of the plurality of calibration modes, wherein the respective calibration parameters include corresponding threshold values.

13. The method of claim 12, further comprising:
causing the calibration control circuit, using the monitoring circuit, to operate in the first one of the plurality of calibration modes for a first plurality of calibrations in which voltage and timing margins exceed corresponding threshold values for a first plurality of consecutive calibrations;
causing the calibration control circuit, using the monitoring circuit, to operate in a second one of the plurality of calibration modes for a second plurality of calibrations in which voltage and timing margins exceed corresponding threshold values for a second plurality of consecutive calibrations; and
causing the calibration control circuit, using the monitoring circuit, to operate in a third one of the plurality of calibration modes in response to voltage and timing margins exceeding the corresponding threshold values for a third plurality of consecutive calibrations;
wherein calibration parameters for the second one of the plurality of calibration modes are less restrictive than those of the first one of the plurality of calibration modes; and
wherein calibration parameters for the third one of the plurality of calibration modes are less restrictive than those of the second one of the plurality of calibration modes.

14. The method of claim 10, wherein reducing an amount of time spent performing the one or more subsequent calibrations comprises one or more of the following:
increasing a calibration step size;
increasing a time interval between calibrations;
skipping a reference voltage calibration;
decreasing a number of calibration loops performed in carrying out at least one instance of the calibration.

15. The method of claim 10, further comprising disabling an on-die termination circuit when operating in the reduced calibration mode.

16. A system comprising:
a memory controller configured to communicate with a memory, wherein the memory controller includes:
a calibration control circuit configured to perform, in a first one of a plurality of calibration modes, a plurality of calibrations to determine voltages and timing margins for memory signals conveyed between the memory controller and the memory;
a storage circuit configured to store results of the calibrations, including voltage and timing margins of one or more of the memory signals; and
a monitoring circuit configured to:
determine, based on the results of the calibrations, if voltage and timing margins for a consecutive number of the plurality of calibrations exceed corresponding voltage and timing thresholds; and
in response to determining that the voltage and timing margins exceed corresponding voltage and timing thresholds for the consecutive number of calibrations, cause the calibration control circuit perform at least one subsequent calibration in a second one of the plurality of calibration modes, wherein calibrations performed in the second one of the calibrations modes have a shorter duration and than calibrations performed in the first one of the calibration modes.

17. The system of claim 16, wherein the monitoring circuit is further configured to, in response to determining that the voltage and timing margins are less than corresponding voltage and timing thresholds for a single calibration performed in the first one of the plurality of calibration modes, cause a plurality of subsequent calibrations to be performed in a third one of a plurality of calibration modes, wherein calibrations performed in the third one of the plurality of calibration modes have a greater duration than calibrations performed in the first one of the calibration modes.

18. The system of claim 16, wherein the calibration control circuit is configured to reduce the duration of the at least one subsequent calibration by performing one or more of the following:
increasing a calibration step size;
increasing a time interval between calibrations;
skipping a reference voltage calibration;
decreasing a number of calibration loops performed in carrying out at least one instances of the calibration.

19. The system of claim 16, wherein the calibration control circuit is further configured to disable an on-die termination circuit when operating in the second one of the plurality of calibration modes.

20. The system of claim 16, wherein the memory controller is configured to operate in different ones of a plurality of performance states, wherein operating in a first one of the plurality of performance states comprises operating at a unique clock frequency with respect to other ones of the plurality of performance states, and wherein the calibration control circuit is configured to perform calibrations in different ones of the plurality of calibration modes for different ones of the plurality of performance states.

* * * * *